US012798719B2

(12) United States Patent
Liedler

(10) Patent No.: US 12,798,719 B2
(45) Date of Patent: Nov. 17, 2026

(54) HYDRAULIC BRAKE ARRANGEMENT FOR AN AT LEAST PARTIALLY MUSCLE-POWERED BICYCLE

(71) Applicant: TRICKSTUFF GMBH, Pfaffenweiler (DE)

(72) Inventor: Klaus Liedler, Sölden (DE)

(73) Assignee: TRICKSTUFF GMBH, Pfaffenweiler (DE)

( * ) Notice: Subject to any disclaimer, the term of this patent is extended or adjusted under 35 U.S.C. 154(b) by 294 days.

(21) Appl. No.: 18/742,703

(22) Filed: Jun. 13, 2024

(65) Prior Publication Data

US 2024/0417027 A1 Dec. 19, 2024

(30) Foreign Application Priority Data

Jun. 15, 2023 (DE) ..................... 10 2023 115 637.3
Aug. 9, 2023 (DE) ..................... 10 2023 121 296.6

(51) Int. Cl.
*B62L 3/02* (2006.01)

(52) U.S. Cl.
CPC .................................... *B62L 3/023* (2013.01)

(58) Field of Classification Search
CPC ....................................................... B62L 3/023
USPC ........ 188/24.15, 344, 352; 60/584, 592, 594
See application file for complete search history.

(56) References Cited

U.S. PATENT DOCUMENTS 4,635,442 A * 1/1987 Bass ..................... B60T 11/165 188/344
7,412,829 B2 * 8/2008 Matsushita ............. B62L 3/023 60/592

FOREIGN PATENT DOCUMENTS

| | | |
|---|---|---|
| DE | 20 2006 020 544 U1 | 12/2008 |
| DE | 10 2013 000 565 A1 | 7/2013 |
| DE | 10 2013 222 856 A1 | 6/2014 |
| DE | 10 2017 107 383 A1 | 10/2017 |
| DE | 10 2021 128 118 B3 | 11/2022 |

OTHER PUBLICATIONS

Search Report received in German Application No. 10 2023 121 296.6, dated Feb. 28, 2024.
Extended Search Report received in European Application No. 24181999.4, dated Oct. 25, 2024.

* cited by examiner

*Primary Examiner* — Christopher P Schwartz
(74) *Attorney, Agent, or Firm* — Greer, Burns & Crain, Ltd

(57) ABSTRACT

A hydraulic brake arrangement for a bicycle with a master unit with a brake lever and a cylinder housing with a cylinder space, and with a piston unit displaceably received in the cylinder space. The piston unit and the cylinder housing delimit a pressure space, which is connected with the tank space through an equalizing hole. A vent duct arrangement connects a vent opening, which opens into the environment of the master unit, both with the tank space opening and with the pressure space opening, so as to allow to simultaneously vent through the vent opening both the tank space and the pressure space. Between the pressure space opening and the vent opening and between the tank space opening and the vent opening, the vent duct arrangement rises so that any air bubbles can rise to the vent opening out of the pressure space and out of the tank space.

15 Claims, 4 Drawing Sheets

HYDRAULIC BRAKE ARRANGEMENT FOR AN AT LEAST PARTIALLY MUSCLE-POWERED BICYCLE

BACKGROUND

The present invention relates to a hydraulic brake arrangement for an at least partially muscle-powered bicycle and comprises at least one master unit, which is provided for fluid connection with a slave unit. The master unit comprises a brake lever and a cylinder housing with a cylinder space, and a piston unit displaceably accommodated in the cylinder space, and at least one equalizing reservoir device with a tank space for a hydraulic fluid. The piston unit and the cylinder housing delimit a pressure space, which is connected with the tank space through at least one equalizing hole.

Hydraulic disk brakes for bicycles offer safe braking, including in fast rides and for example in sports cycling, for racing bicycles or mountain bikes. Moreover, safe braking is also provided for electric bicycles or city bikes. Due to the hydraulic actuation, however, maintenance of these brakes tends to call for increased requirements. This relates e.g. to filling up the hydraulic fluid and venting the closed hydraulic circuit. Air bubbles in the hydraulic circuit can considerably affect the function of the brake, and thus they require removal in venting as completely as possible.

Venting requires venting both of the pressure space and the other spaces pressurized during braking (so-called high pressure region) as well as the tank space respectively the spaces not under brake pressure during braking (so-called low pressure region). As a rule, both the high pressure region as well as the low pressure region are provided with vent openings. This renders the entire venting process very complex and time-consuming.

To somewhat simplify venting, the prior art suggests to place the equalizing hole as high as possible in the cylinder space. Then, the air bubbles can stream from the high pressure region into the equalizing reservoir, unless the equalizing hole is closed by the piston unit. Subsequent venting of the equalizing reservoir then also removes the air bubbles from the high pressure region. It is a drawback, however, that the cylinder space must extend in quite specific positions, so as to render the structure of the master unit very limited on the whole, hardly allowing particularly compact implementation.

To further simplify venting, DE 10 2021 128 118 B3 proposes an additional fluid connection between the pressure space and the tank space. This fluid connection may be disabled in normal operation and temporarily enabled in a quick-action position.

To enable a particularly compact configuration of the master unit, the longitudinal axis of the piston unit may be disposed radially (e.g. nearly orthogonally) to the longitudinal axis of the handlebar (so-called “radial piston pumps” respectively “radial piston brakes”). This design, however, prohibits venting the master unit in its proper position on the handlebar. It must be partially removed from the handlebar and pivoted to a quite specific position. This position is highly dependent on the concrete flow paths in the master unit interior. Thus, even skilled persons must refer to technical instructions to perform safe venting.

Document DE 20 2006 020 544 U1 also relates to simplifying the venting of bicycle brakes. It is proposed to provide the equalizing reservoir device with two reservoirs, both in the low pressure region. The reservoirs open on different levels into one shared duct, which is closed by a vent screw. Thus, air bubbles can be removed from both reservoirs by unscrewing the vent screw. To this end, the master unit must be rotated around the handlebar axis, until the cover of the equalizing reservoir device faces upwardly.

In view of this, it is the object of the present invention to provide an improved hydraulic brake arrangement. Particularly safe and reliable, and also simple, venting is intended.

SUMMARY

The hydraulic brake arrangement according to the invention is provided for an at least partially muscle-powered bicycle. The brake arrangement comprises at least one master unit provided for fluid connection with a slave unit (by means of a line device). The brake arrangement may comprise at least one slave unit. The brake arrangement may comprise at least one handlebar mount for mounting the master unit to a handlebar. The master unit comprises a brake lever and a cylinder housing with a cylinder space. The master unit comprises a piston unit displaceably accommodated in the cylinder space (along a longitudinal axis). The master unit comprises at least one equalizing reservoir device with at least one tank space for a hydraulic fluid. The piston unit and the cylinder housing delimit a pressure space (provided for fluid connection with the slave unit). The pressure space is connected with the tank space through at least one equalizing hole. At least one vent duct arrangement is provided. The vent duct arrangement connects a vent opening, which opens into the environment of the master unit (respectively into open air) both with the tank space opening and with the pressure space opening. This allows simultaneous venting through the vent opening, both of the tank space and the pressure space. The vent duct arrangement opens, in particular, through the pressure space opening into the pressure space. The vent duct arrangement opens, in particular, through the tank space opening into the tank space.

The handlebar mount, in particular, defines a mounting axis (for mounting to the handlebar). The master unit can, in particular, be mounted (to the handlebar) by means of the handlebar mount at any (desired) rotation angle around the mounting axis. The brake lever is, in particular, disposed at a lever-side end of the master unit, and the handlebar mount, at a handlebar-side end of the master unit.

It is preferred for the vent duct arrangement to (continuously) rise respectively to show a (continuous) rise between the pressure space opening and the vent opening, and between the tank space opening and the vent opening, so that any air bubbles from the pressure space and from the tank space can rise (by uplift) to the vent opening. This is provided, in particular, in the case that the master unit is rotated around the mounting axis so that the lever-side end faces downwardly, and/or the pressure space opening lies in the range of the highest spot of the pressure space, and/or the tank space opening lies in the range of the highest spot of the tank space. Then, the master unit is, in particular, in an intended mounted position.

The brake arrangement according to the invention offers many advantages. One considerable advantage is provided by the vent duct arrangement. It vents both the high pressure region and the low pressure region, together respectively simultaneously, for example through one single vent opening. The vent duct arrangement may also be advantageously employed in master units in the design of a radial piston pump. On the whole, the invention enables a particularly comfortable while also secure venting of the high pressure region and the low pressure region, which even inexperienced users can reliably perform. It is a particular advantage that any air bubbles present in the low pressure system and also in the high pressure system can readily escape into open air due to uplift, when the vent opening is opened.

In particular, is the master unit rotated around the mounting axis so that the vent opening provides the highest spot of the vent duct arrangement. In particular, is the master unit rotated around the mounting axis so that the vent opening is disposed at a higher level than are the pressure space opening and the tank space opening.

Preferably, the air bubbles can rise to the vent opening out of the pressure space and out of the tank space, at least when the master unit is rotated around the mounting axis at an angle between 0° and 90° to the horizontal. Then, the lever-side end, in particular, faces downwardly. Then, the master unit is, in particular, inclined downwardly at an angle of maximally 75° or maximally 60° or maximally 55° to the horizontal. It is also possible for the master unit to be inclined downwardly at an angle of maximally 50° or maximally 45° to the horizontal. Then, the master unit is, in particular, inclined downwardly at an angle of at least 5° or at least 7° or at least 10° or at least 15° or at least 20° to the horizontal.

These angles comply with the mounted positions for master units tried and proven in mountain bike sports and enable ergonomic operation of the brake lever. It is thus particularly advantageous for any air bubbles in these mounted positions to be allowed to rise up to the vent opening. Thus, the tank space and the pressure space can be vented simultaneously directly in the mounted position of the master unit. Thus, venting does not require any unfastening and rotating of the master unit on the handlebar. With the master unit rotated around the mounting axis at such an angle to the horizontal, the mounted position is, in particular, as intended. The particulars on the rotation angle of the master unit relative to the mounting axis relate, in particular, to the principal plane of the master unit and/or to the longitudinal axis of the piston unit, and/or of the cylinder housing.

In particular, is the piston unit accommodated in the cylinder space for displacement along the longitudinal axis. In particular, does the piston unit extend in respect of its longitudinal axis between the lever-side end and the handlebar-side end. In particular, is the piston unit displaceable by operating the brake lever from the lever-side end in the direction toward the handlebar-side end. In operating the brake lever, the piston unit is, in particular, moved toward the handlebar-side end and in particular toward the handlebar mount (and thus, also to the handlebar).

This configuration, in particular, corresponds to the construction of a radial piston pump. The angle between the longitudinal axis of the piston unit and the horizontal, in particular, also corresponds to the angle around which the master unit is rotated around the mounting axis to the horizontal. In the intended mounted position, the longitudinal axis of the piston unit is preferably inclined downwardly at its the lever-side end.

Preferably, the vent duct arrangement opens into the pressure space in the vicinity of the highest spot of the pressure space and, in particular, in the highest spot of the pressure space. In particular, does the vent duct arrangement open into the pressure space such that any air bubbles may (due to uplift) rise from the pressure space into the vent duct arrangement. Preferably, the vent duct arrangement opens into the pressure space at least in the top quarter or top eighth of the pressure space.

Preferably, the vent duct arrangement opens into the tank space in the vicinity of the highest spot of the tank space and, in particular, in the highest spot of the tank space. In particular, does the vent duct arrangement open into the tank space such that any air bubbles may (due to uplift) rise from the tank space into the vent duct arrangement. Preferably, the vent duct arrangement opens into the tank space at least in the top quarter or top eighth of the tank space.

This offers the particular advantage that air bubbles may rise up to the vent opening from the tank space and the pressure space due to uplift, when the master unit is mounted to the handlebar ready for operation. Then, venting does not require anything but e.g. releasing the vent opening.

The particulars provided in the scope of the present invention on the highest spots and the orientation of the vent duct arrangement, relate, in particular, to the proper, intended mounted position of the master unit on the handlebar of a bicycle. The proper, intended mounted position is, in particular, given at least when the longitudinal axis of the pressure space and/or the tank space and/or the piston unit and/or a branch duct of the vent duct arrangement extend(s) horizontally and/or when the longitudinal axis of a primary duct of the vent duct arrangement extends vertically. Preferably, the proper, intended mounted position is given even if these longitudinal axes deviate from the horizontal respectively vertical within a certain angular range. These angular ranges will be defined below. What is particularly preferred is a mounted position in which the longitudinal axis of the pressure space and/or the tank space and/or the piston unit is slanted obliquely downwardly. The pressure space and the tank space are, in particular, arranged relative to one another such that their respective highest spots lie in the pertaining mouth of the vent duct arrangement when the master unit is in the proper, intended mounted position. In the scope of the present invention, the highest spot may be part of the highest line or highest area.

In particular, is the vent duct arrangement provided to be closed by means of a detachable paddle, at least in sections. Preferably, the paddle can be inserted in the vent duct arrangement such that the pressure space is sealed relative to the tank space and also relative to the vent opening (respectively the environment) and that preferably, the tank space is likewise sealed relative to the environment. In the scope of the present invention, particulars on the seal tightness relate, in particular, to the pressure conditions expected in proper, intended operation of the master unit. The paddle, in particular, seals the vent opening relative to the environment.

An advantageous configuration provides that detaching the paddle connects the pressure space with the tank space and that preferably, the vent opening is opened as well. In particular, the pressure space is first connected with the tank space. Thereafter or simultaneously, in particular, the vent opening is opened, and/or the pressure space and the tank space are connected with the environment. In particular, detaching includes at least partially removing (unscrewing) the paddle from the vent duct arrangement.

The paddle is preferably configured as a screw, or comprises at least one screw. The paddle is, in particular, configured integrally. In particular, does the paddle show, at least in sections, an external thread which corresponds with an internal thread of the vent duct arrangement.

In an advantageous specific embodiment, the paddle is provided with a blind hole extending in the axial direction. The blind hole, in particular, opens into the environment in a top end of the paddle. In particular, is the blind hole provided to be closed (outwardly) relative to the environment by means of a blind hole locking screw. The blind hole locking screw preferably includes at least one sealing agent at its top end.

In particular, is the blind hole locking screw provided to screw into the paddle at a top end. In particular, are the paddle and the blind hole locking screw disposed coaxially to one another. The principal duct and the blind hole, in particular, extend coaxially to one another. The paddle shows, in particular, in the region of the blind hole an internal thread corresponding with an external thread of the blind hole locking screw. In particular, is the collar section configured for applying wrenches or screwdrivers. In particular, the blind hole locking screw includes a tool socket for applying screwdrivers.

In particular, is the paddle provided with a transverse duct extending in the radial direction. In particular, does the transverse duct extend radially outwardly from the blind hole (up to the paddle exterior). In particular, does the transverse duct (on the paddle exterior) open into the vent duct arrangement and preferably into the principal duct (when the paddle is properly inserted in the vent duct arrangement). In particular, does the transverse duct open beneath the threaded portion and/or above the sealing surface of the paddle.

In particular, are the blind hole and, in particular, also the transverse duct not in flow connection with the pressure space when the paddle is properly inserted in the vent duct arrangement. In particular, are the blind hole and, in particular, also the transverse duct in flow connection with the tank space and/or the branch duct when the paddle is properly inserted in the vent duct arrangement. In particular, does the blind hole locking screw seal the blind hole relative to the environment. In particular, does the blind hole locking screw thus also seal the tank space (and the branch duct and the transverse duct) relative to the environment.

The specific embodiment described above shows the advantage that with a properly inserted paddle, only the blind hole locking screw needs to be undone for venting the tank space or filling it with hydraulic fluid. The pressure space continues to be sealed. Thus, on the one hand, an advantageous "simultaneous vent" of the pressure space and the tank space is possible, and on the other hand, solely the tank space may be vented or filled, as required.

The brake arrangement may comprise at least one tubular filling adapter with two ends. The filling adapter can, in particular, be screwed into the vent duct arrangement (preferably into the principal duct) with its first end, instead of the paddle. The first end preferably seals the pressure space (if properly screwed in). The first end, in particular, corresponds with the seating. The filling adapter, in particular, comprises a blind hole which opens into a second end. The filling adapter, in particular, comprises at least one radial filling duct which extends from the blind hole radially outwardly. The second end of the filling adapter is, in particular, provided for connection with a hose and/or container for feeding hydraulic fluid. The second end is, in particular, flow-connected with the tank space through the blind hole and the filling duct, when the filling adapter is properly screwed in. This allows filling the tank space with hydraulic fluid and simultaneously venting as required, while the pressure space remains closed.

It is advantageous and preferred for the vent duct arrangement to comprise at least two duct branches. At least one (first) duct branch, in particular, opens into the pressure space. At least one (second) duct branch, in particular, opens into the tank space. In particular, at least one of the duct branches, in particular, the first duct branch, opens into the environment of the master unit through the vent opening. In particular, at least one of the duct branches, in particular, the second duct branch, opens into the at least one further duct branch, in particular, into the first duct branch. It is also possible for at least two duct branches, in particular, the first and second duct branches, to open into the environment through the vent opening. It is also possible for the first duct branch to open into the second duct branch. Then preferably, at least the second duct branch opens into the environment through the vent opening.

In an advantageous and preferred configuration, the vent duct arrangement comprises at least one principal duct and at least one branch duct. The principal duct, in particular, extends from the pressure space to the vent opening. The branch duct, in particular, extends from the principal duct to the tank space. It is also possible for the principal duct to extend from the tank space to the vent opening, and for the branch duct to extend from the principal duct to the pressure space. Preferably, the branch duct branches off the principal duct. Preferably, the branch duct connects the tank space with the principal duct. The branch duct cross section is, in particular, smaller than the principal duct cross section. The branch duct branches off the principal duct, in particular, between the vent opening and the pressure space.

In an advantageous configuration, the principal duct extends steeper than does the branch duct. The principal duct, in particular, extends at an angle between 0° and 65° or between 0° and 45° and preferably between 0° and) 35° (25° to the vertical. The branch duct, in particular, extends at an angle between 0° and 65° or between 0° and 45° and preferably between 0° and) 35° (25° to the horizontal, upwardly or downwardly, in the direction toward the principal duct respectively the vent opening. The branch duct extends, in particular, transverse and for example orthogonally (90°+/−25° or 90°+/−) 15° to the principal duct. The branch duct extends, in particular, from the tank space obliquely upwardly toward the principal duct. The branch duct may extend in parallel to the longitudinal axis of the piston unit and/or of the pressure space. It is possible for the branch duct to extend steeper than does the principal duct.

The longitudinal axis of the principal duct, in particular, extends at an angle of 120°+/−45° and preferably 120°+/−35°, to the longitudinal axis of the piston unit and/or of the pressure space and/or of the tank space. The angle may for example be 120°+/−10° or 90°+/−10°. This allows particularly reliable venting while simultaneously allowing a large bandwidth of mounted positions in which optimal venting is provided. For example, these configurations allow particularly good venting while the master unit is mounted to the handlebar declined 25°+/−15° downwardly to the horizontal (in respect of the longitudinal axis of the piston unit respectively to the principal plane of the master unit).

It is advantageous and preferred for the principal duct and/or the branch duct to show a straight outline. The principal duct and/or the branch duct, in particular, can be, or are, manufactured by means of drilling or another, comparable process. The principal duct and/or the branch duct, in particular, show a cylindrical duct cross section, at least in sections. Another cross sectional geometry is likewise possible. In particular, does the principal duct comprise two cross sections having different diameters. The principal duct is, in particular, configured conical in sections (in particular, in the region of transition from one to the other duct cross section). This, in particular, provides the sealing surface described below.

In a particularly preferred and advantageous specific embodiment, the paddle shows a sealing surface and preferably a conical sealing surface, at the bottom end facing the pressure space or the tank space. The sealing surface, in particular, corresponds with a seating. The seating is, in particular, provided by a cross-section restriction in the principal duct. The seating, in particular, forms part of a housing body, in which the vent duct arrangement is configured. The seating is, in particular, configured conical. Also possible are other suitable geometries of the sealing surface and/or the seating, and sealing types, e.g. rubber seals, O-rings or the like.

The sealing surface, in particular, bears against the seating to provide sealing, so that the paddle seals the pressure space from the tank space. In particular, is the pressure space sealed from the vent duct arrangement only by the sealing surface and the seating. The seating and the sealing surface, in particular, thus bear against one another sealed by way of properly inserting, and preferably screwing, the paddle into the vent duct arrangement. The sealing between the seating and the sealing surface is, in particular, configured pressure-resistant.

The paddle preferably has a collar section at the top end facing the vent opening. In particular, at least one sealing body is disposed between the collar section and the housing body, in which the vent duct arrangement is configured. In particular, the vent duct arrangement is thus sealed from the environment. In particular, the sealing body is pressed in between the paddle and the housing body, so that the inserted (screwed-in) paddle seals the tank space relative to the vent opening respectively the environment. In particular, the sealing body is configured as a sealing ring. In particular, the collar section protrudes beyond the vent opening in the radial direction. In particular, the collar section is provided by a screw head.

The paddle, in particular, comprises at least one threaded portion for screwing into the vent duct arrangement and preferably into the principal duct. In particular, the threaded portion is disposed between the branch duct and the vent opening. In particular, the threaded portion is not disposed between the branch duct and the pressure space. These configurations of the threaded portion are, in particular, provided when the paddle is screwed into the vent duct arrangement (so as to seal the pressure space relative to the tank space). Thus, screwing the paddle in enables hydraulic fluid (or air) to escape through the branch duct into the tank space. Basically, however, hydraulic fluid (or air) can preferably also escape through the equalizing hole into the tank space.

In particular, the principal duct has an internal thread portion corresponding with the threaded portion. In particular, the branch duct branches off the principal duct between the seating and the internal thread portion. In particular, the branch duct opens into the principal duct external of the internal thread portion. In particular, the branch duct opens into the principal duct beneath the internal thread portion and above the seating.

In particular, at least one gap is formed between the paddle and the principal duct wall, which extends beneath the branch duct and/or beneath the internal thread portion, at least in sections in the radial direction (while the paddle is inserted). In particular, the gap enables hydraulic fluid to escape from the principal duct through the branch duct into the tank space, when the paddle is inserted.

It is preferred and advantageous for the entire branch duct to extend at a level higher than the highest spot of the pressure space. In particular, the entire principal duct also extends at a level higher than the highest spot of the pressure space. In particular, the branch duct, starting from its mouth into the tank space, extends at least horizontally or at an upward incline toward the principal duct and/or to the vent opening. In particular, neither the branch duct nor the principal duct extend downwardly in sections, such that air bubbles might be caught. In particular, the entire branch duct extends at a level higher than the highest spot of the tank space.

It is advantageous and preferred for the mouth of the branch duct into the tank space and/or the mouth of the branch duct into the principal duct to be disposed at a level higher than the mouth of the principal duct into the pressure space and, in particular, at a level higher than the highest spot of the pressure space. It is possible for the mouth of the branch duct into the tank space to lie lower or higher than the mouth of the branch duct into the principal duct. It is also possible for the two mouths of the branch duct to lie at the same height level. The outline of the branch duct, in particular, also depends on the accessibility of the tank space in the scope of manufacturing the branch duct. For example, there should be sufficient room for applying a chip removal tool in the tank space at the desired angle.

The paddle is preferably disposed in the principal duct only when it seals the pressure space relative to the tank space and also to the vent opening, and, in particular, also seals the tank space relative to the vent opening. In particular, the paddle can only be disposed in the principal duct.

Preferably, the tank space is disposed above the pressure space at least in sections. In particular, the tank space is positioned above the highest spot of the pressure space. It is also possible for the tank space to be disposed adjacent to the pressure space at least in sections.

In particular, the vent opening represents the highest spot of the vent duct arrangement and preferably of the entire hydraulic circuit. In particular, the vent opening is disposed at a level higher than the highest spot of the tank space and/or than the highest spot of the pressure space. In particular, the vent opening lies higher than the branch duct. In particular, the paddle lies higher than, or at the same height level as, the vent opening, if it is properly inserted in the vent duct arrangement.

The brake arrangement may comprise at least one handlebar. In particular, the handlebar mount and the piston unit are disposed relative to one another so that the piston unit protrudes radially from the handlebar relative to its longitudinal axis (relative to the longitudinal handlebar axis), when the master unit is in the proper, intended mounted position. The longitudinal axis of the piston unit may protrude at an angle of 90° to the longitudinal handlebar axis, or at an angle of less than 90° to the longitudinal handlebar axis, in the direction to the handlebar. In particular, the angle may be 25° to 90°, or 35° to 90°, or 45° to 90°. Angles of 50° to 90° are likewise possible.

Among cyclists, the master unit in these arrangements is also referred to as a radial piston pump. In combination with this design, the invention presented herein can particularly advantageously be employed for venting. In particular, the piston unit does not extend in parallel to the longitudinal axis of the handlebar in relation to its longitudinal axis. In particular, the longitudinal axis of the piston unit extends at an angle between 45° and 90° to the longitudinal axis of the brake lever. In particular, an imaginary extension of the longitudinal axis of the piston unit and/or of the tank space intersects the brake lever (in particular, between the distal end of the brake lever and the brake lever pivot axis). When operating the brake lever, the piston unit is, in particular, (substantially) moved in the same direction as is the brake lever. The piston unit is, in particular, urged in the direction of the handlebar by operating the brake lever.

In the proper, intended mounted position, the longitudinal axis of the piston unit and/or of the pressure space is preferably inclined downwardly to the horizontal. In particular, the longitudinal axis of the piston unit and/or of the pressure space is inclined downwardly to the horizontal between 0° and 90°. In a specific embodiment, the brake arrangement may comprise at least one handlebar to which the master unit is thus mounted, inclined downwardly.

In particular, the longitudinal axis of the piston unit and/or of the pressure space is inclined downwardly to the horizontal maximally 75° or maximally 60°. It is possible and preferred for the longitudinal axis of the piston unit and/or of the pressure space to be inclined downwardly to the horizontal maximally 45° or maximally 35° or maximally 30°. In the proper, intended mounted position, the longitudinal axis of the piston unit and/or of the pressure space may extend in parallel to the horizontal. These angles enable particularly reliable venting through the vent duct arrangement.

In particular, configurations, the longitudinal axis of the piston unit and/or of the pressure space may be inclined upwardly to the horizontal when in the proper, intended mounted position. Then, the pressure space and/or the tank space are, in particular, configured accordingly in respect of their highest spot. In particular, the longitudinal axis of the piston unit is inclined upwardly maximally 30° or maximally 25° or maximally 20° to the horizontal. Also possible is an upwardly inclination of maximally 15° or maximally 10° or maximally 5° to the horizontal.

In particular, the longitudinal axis of the piston unit extends in parallel to the principal plane of the master unit. In particular, the longitudinal axis of the brake lever extends in parallel to the principal plane of the master unit. In particular, the principal plane of the master unit is inclined to the horizontal as it has been described above for the longitudinal axis of the piston unit. In these configurations, the term "longitudinal axis of the piston unit (and/or of the pressure space)" may be used synonymously with the term "principal plane of the master unit".

In the proper, intended mounted position, the master unit is, in particular, ready for braking respectively serviceable for braking the bicycle in operation. Preferably, the master unit is also in the proper, intended venting position. In particular, the proper, intended mounted position also corresponds to the proper, intended venting positions. In the venting position, air bubbles can rise from the pressure space and from the tank space through the vent duct arrangement, up to the vent opening. This allows venting the master unit in its proper, intended mounted positions on the handlebar. It does not need to be shifted to another, mounted position specifically provided for venting. The master unit is, in particular, provided for a straight handlebar respectively mountain bike handlebar, and, in particular, not for use with a racing bicycle handlebar.

The bicycle according to the invention comprises a hydraulic brake arrangement, as it is presently described. In particular, the at least one master unit is mounted to the bicycle handlebar in the proper, intended mounted position. In particular, the bicycle comprises at least one handlebar. The mounting axis, in particular, corresponds to the longitudinal axis of the handlebar in the spot of the handlebar where the master unit is mounted. The bicycle is, in particular, configured as a mountain bike. The handlebar is, in particular, a so-called straight handlebar and preferably a mountain bike handlebar. The handlebar may be configured as a flat bar or rise bar. The handlebar is, in particular, not a racing bicycle handlebar.

In particular, a connection port for coupling a line device is disposed at a lower level than the vent duct arrangement. In particular, the connection port serves to connect the master unit with the slave unit. The hydraulic fluid in the pressure space communicates, in particular, through the connection port with the hydraulic fluid in the line device respectively the slave unit. The cylinder housing comprises, in particular, on a slave end, a connection port for linking a line device. The hydraulic fluid in the pressure space communicates, in particular, through the connection port with the hydraulic fluid in the line device respectively the slave unit.

In particular, is the vent duct arrangement disposed between the handlebar mount and the tank space and/or the pressure space. In particular, is the vent duct arrangement configured in the housing wall, which is configured integrally with a part of the handlebar mount and/or with the cylinder housing and/or with the wall of the tank space. In particular, is the vent duct arrangement configured in the base body of the master unit. The handlebar link is, in particular, integrally configured with the base body, at least partially. The base body is preferably configured integrally. In particular, is the cylinder housing an integral part of the base body. In particular, is the vent duct arrangement at least partially, and preferably entirely, disposed in the base body.

In particular, is the vent opening also configured as a filling mouth for filling the hydraulic fluid into the tank space respectively into the hydraulic circuit (so-called comfort vent). Venting is, in particular, possible without removing the membrane unit. Alternately, the equalizing reservoir device may comprise at least one separate filling mouth for filling the hydraulic fluid into the tank space.

In particular, the vent duct arrangement comprises at least three mouths. In particular, a first mouth (high pressure mouth) lies in the region of the highest spot of the pressure space. In particular, a second mouth (low pressure mouth) lies in the region of the highest spot of the tank space. In particular, a third mouth lies in the vent opening, so that here, the vent duct arrangement opens into the environment of the master unit respectively into open air.

In particular, the paddle provides for at least two sealing levels. A first sealing level is, in particular, provided for the paddle to seal the pressure space relative to the tank space and to the vent opening respectively to the environment. A second sealing level is preferably provided for the paddle to seal the vent opening respectively the vent duct arrangement relative to the environment. In particular, the sealing surface and the seating combined provide the first sealing level. In particular, the sealing body and the collar section and the housing body combined provide the second sealing level.

In particular, the equalizing hole is disposed in the cylinder housing. In particular, the equalizing hole connects the pressure space with the tank space, when the piston unit is in a rest position respectively when the master unit is not actuated. In the case of actuation of the master unit, the piston unit seals the pressure space, in particular, against the fluid space, such that pressure can be applied on the pressure space. In other words, actuating the master unit allows the piston unit to close the equalizing hole. A subsequent further movement of the piston unit results, in particular, in a pressure buildup in the pressure space and in reduction of the pressure space volume.

The pressure space, in particular, represents part of the cylinder space. In particular, actuating the master unit provides for brake pressure in the pressure space. The pressure space thus forms part of the high pressure region of the hydraulic circuit. Actuating the master unit respectively braking provides for low pressure respectively atmospheric pressure in the tank space. The tank space thus forms part of the low pressure region of the hydraulic circuit. The master unit is, in particular, actuated by (manually) moving respectively actuating the brake lever. The piston unit is, in particular, pressed by pulling the brake lever into the pressure space. In particular, the piston unit is not pulled into the pressure space.

The equalizing hole may comprise, or be provided by, one or more single holes. The equalizing hole discussed in the scope of the present invention, in particular, relates to all the single holes. The equalizing hole may also be referred to as snifter hole. The equalizing hole respectively a bore is, in particular, understood to mean a duct-type through hole, which is not necessarily manufactured by boring or drilling. A part of the cylinder space lying external of the pressure space may be connected with the tank space by means of at least one lubrication hole. In particular, the equalizing hole and/or the lubrication hole lie on a level lower than the mouth of the vent duct arrangement into the tank space. In particular, the mouth of the equalizing hole and/or of the lubrication hole lies on a level lower than the mouth of the vent duct arrangement in the pressure space respectively cylinder space.

In particular, the vent duct arrangement interconnects the pressure space with the tank space (in addition to the equalizing hole) and at the same time also with the vent opening. The vent opening serves, in particular, for venting the hydraulic circuit. In particular, the master unit does not comprise any further proper, intended venting options, other than the vent duct arrangement. The slave unit may comprise at least one vent opening.

The highest spot in particular relates to a location where air bubbles may accumulate, due to uplift, in the tank space respectively in the pressure space. The tank space is, in particular, delimited by walls and/or at least one cover and/or by at least one membrane unit. The highest spot of the tank space lies in particular within the space which is enclosed by the walls and/or by the cover and/or by the membrane unit. The highest spot of the tank space, in particular, does not lie external of the walls and/or of the cover and/or the membrane unit. When the equalizing reservoir device is provided with a membrane unit, the membrane unit, in particular, does not show any bulges which might displace the highest spot of the tank space to a spot other than the mouth of the vent duct arrangement.

Further advantages and features of the present invention can be taken from the exemplary embodiments which will be described below with reference to the enclosed figures.

DETAILED DESCRIPTION

Figure 1:
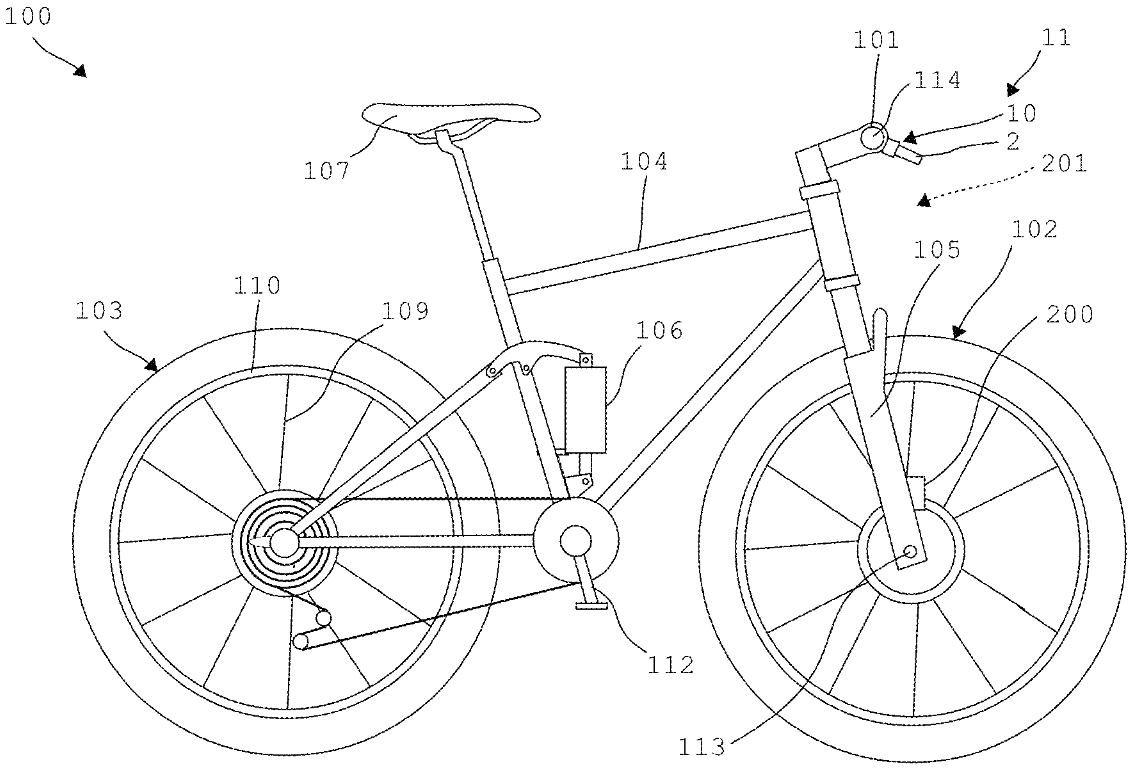
FIG. 1 a schematic illustration of a mountain bike with a brake arrangement according to the application.

FIG. 1 shows a bicycle 100 configured as a mountain bike, equipped with a hydraulic brake arrangement 1 according to the application. The bicycle 100 is provided with a front wheel 102 and a rear wheel 103, provided to be braked separately by means of separate hydraulic circuits 11. To this end, the hydraulic circuits 11 each comprise a master unit 10 and a slave unit 200.

The bicycle 100 comprises a frame 104, a handlebar 101 with grips 114, a saddle 107, a fork or suspension fork 105, and a rear wheel damper 106 may be provided as required. A pedal crank 112 with pedals serves for driving. Optionally, the pedal crank 112 and/or the wheels 102, 103 may be provided with an electric auxiliary drive. Each of the wheels 102, 103 comprises a rim 110, which is connected with a hub by means of spokes 109. The hubs of the wheels 102, 103 may each be attached to the frame 104 or the fork 105 by means of a clamping system 113 (for example a through axle or a quick release).

The frame 104 and the fork 105 each have a slave unit 200 fastened thereto, presently configured as hydraulic disk brakes. The slave unit 200 is connected with the associated master unit 10 by means of a line device 201, not visible, such that a closed hydraulic circuit 11 results. The master units 10 of a bicycle 100 are mounted to opposite ends of the handlebar 101, each showing a brake lever 2 provided for finger actuation.

The brake arrangement 1 according to the application will now be described in detail with reference to the FIGS. 2 and 3.

The master unit 10 is fastened to the handlebar 101 of a bicycle 100, presently by means of a handlebar link 8, in a mounting position as intended. The handlebar mount 8 shown is an integral component of the base body 20 enclosing the handlebar 101, together with one or more linking section(s) (presently for example configured as a clamp provided for screwing to the handlebar mount 8). The handlebar mount 8 defines a mounting axis 18, which is presently also the longitudinal axis of the handlebar 101. The master unit 10 can be rotated around the mounting axis 18, for orienting the brake lever 2 in the ergonomically best position. The handlebar mount 8 serves to fixate the master unit at the desired rotation angle, for example by tightening the clamp. The handlebar mount 8 defines a handlebar-side end 28 of the master unit 10.

Figure 2:
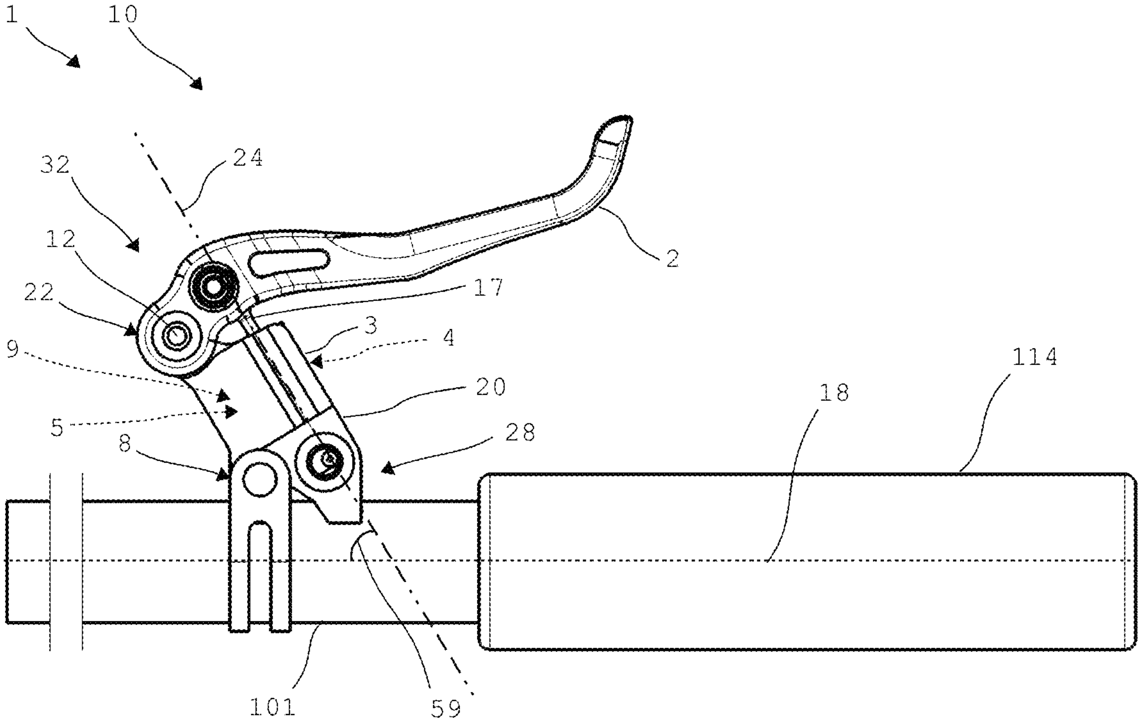
FIG. 2 a schematic illustration of a brake arrangement according to the application on the handlebar of a bicycle in a top view.

The master unit 10 comprises a cylinder housing 3 with a cylinder space 13 and a piston unit 4 displaceably accommodated in the cylinder space 13 (in the FIG. 2 not visible, in the interior). The cylinder housing 3 is also an integral component of the base body 20. The cylinder housing 3 comprises a connection port 93 for coupling the line device 201.

A brake lever 2, likewise integrated in the base body 20, is supported on a lever accommodation 22 so that said lever can pivot around a brake lever pivot axis 12. The brake lever 2 is coupled to the piston unit 4 by means of an actuating mechanism with a connecting rod 17. The brake lever 2 defines a lever-side end 32 of the master unit 10.

Pulling the brake lever 2 causes displacement of the piston unit 4 in the cylinder space 13. The piston unit 4 comprises a piston 14 and a piston sealing device, which is provided by a primary sealing 54 and a secondary sealing 64. The piston unit 4 is shown in a rest position, since the master unit 10 is not being actuated.

For storing hydraulic fluid, an equalizing reservoir device 5 with a tank space 15 and a cover 85 is provided. The hydraulic fluid provided here is a biologically decomposable oil. Alternately, mineral oil or brake fluid (DOT) may be provided. The tank space 15 is delimited by a tank trough 75 and a membrane unit 6. The tank trough 75 is an integral component of the base body 20.

The membrane unit 6 extends between the tank space 15 and the cover 85 and seals the tank space 15 relative to the air space 45 located beneath the cover 85. Deformation of the membrane unit 6 adapts the tank space 15 volume to the oil level given at the time. Then the air space 45 decreases and increases correspondingly. The air space 45 is connected with the environment through a vent opening, to enable pressure compensation.

The piston unit 4 and the cylinder housing 3 limit a pressure space 131, which forms part of the cylinder space 13. The pressure space 131 is connected with the tank space 15 through an equalizing hole 53 configured in the cylinder housing 3. Merely exemplarily, the equalizing hole 53 comprises a total of three single holes.

The equalizing hole 53 is exposed when the piston unit 4 is in the rest position. When the master unit 10 is actuated, the piston unit 4 seals the pressure space 131 against the tank space 15 with its primary sealing 54. This applies pressure on the pressure space 131, when the brake lever 2 continues to be pulled. Then, the slave unit 200 is actuated, and for example the piston of the disk brake is extended.

In addition to the equalizing hole 53, the cylinder space 13 is connected with the tank space 15 through a lubrication hole 63. The lubrication hole 63 opens into a part of the cylinder space 13 lying outside of the pressure space 131. Through the lubrication hole 63, hydraulic fluid can flow behind the primary sealing 54, thus lubricating the piston unit 4. Moreover, the hydraulic fluid can return into the tank space 15 through the lubrication hole 63, when it has flowed behind the primary sealing 54. The lubrication hole 63 is sealed by the secondary sealing 64.

As best shown in the FIG. 2, the master unit 10 is configured in the design of a so-called "radial piston pump", and radially protrudes from the handlebar 101. The longitudinal axis 24 of the piston unit 4 (drawn in a dash-dotted line) intersects (in an imaginary extension) the mounting axis 18 respectively longitudinal axis of the handlebar 101 at an angle 59 of e.g. 55°+/−10°. This makes the master unit 10 particularly compact.

To enable a particularly comfortable and also reliable venting (the construction of a radial piston pump notwithstanding), the master unit 10 is provided with a specific vent duct arrangement 9 (in the FIG. 2 invisible, in the interior). The vent duct arrangement 9 opens into the environment through a vent opening 65, connecting the vent opening 65 both with the tank space 15 and with the pressure space 131. This allows concurrent respectively simultaneous venting both of the tank space 15 (low pressure region) and the pressure space 131 (high pressure region), from the vent opening 65.

The vent duct arrangement 9 opens into the pressure space 131 through a pressure space opening 89 in the highest spot of the pressure space 131. The vent duct arrangement 9 also opens into the tank space 15 through a tank space opening 79 in the highest spot of the tank space 15. This allows the air bubbles from the pressure space and from the tank space 15 to rise into the vent duct arrangement 9 and to escape into the environment through the vent opening 65. The rising of the air bubbles works particularly reliable when the master unit 10 is in the proper, intended mounted position on the handlebar 101.

Figure 3:
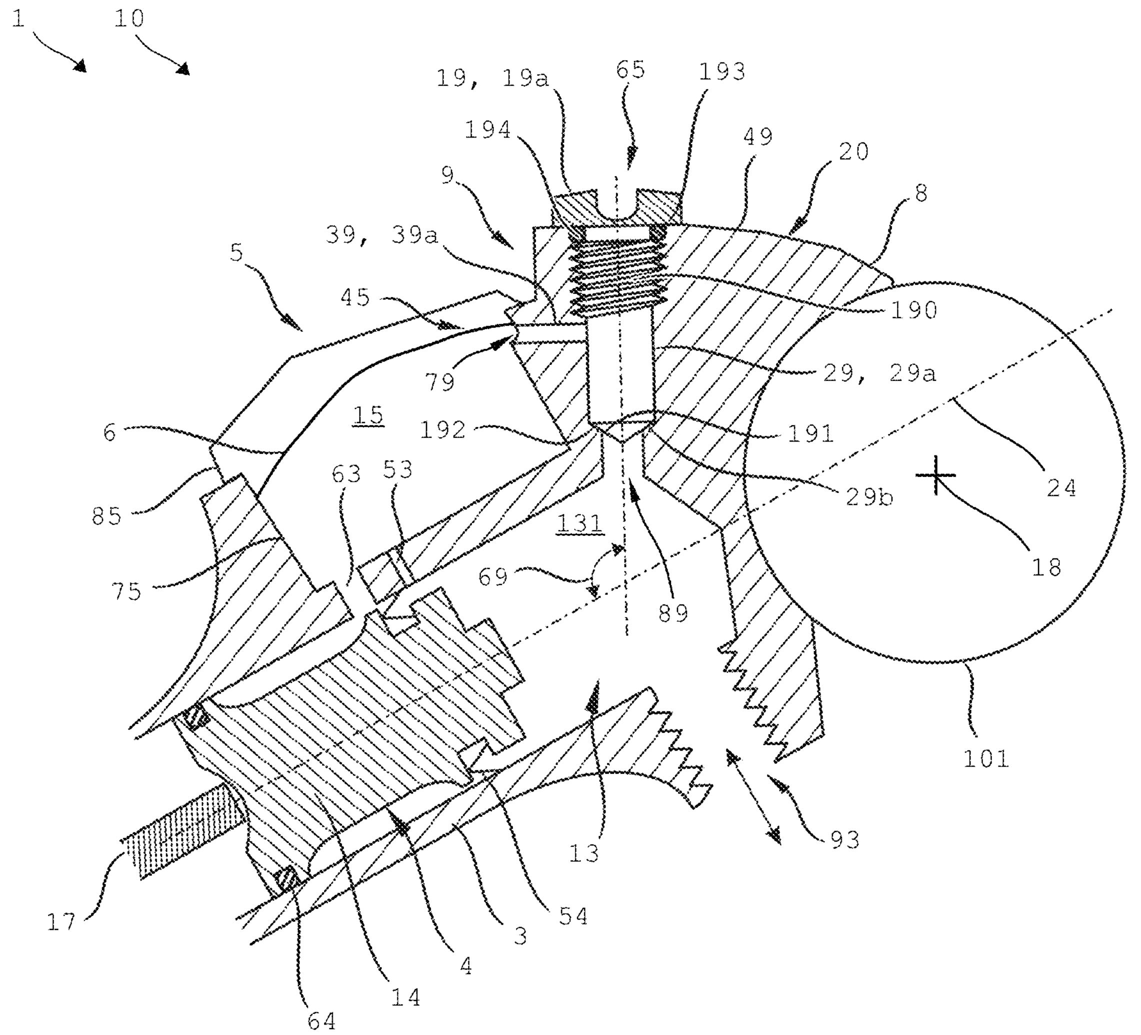
FIG. 3 a schematic detail illustration of the brake arrangement in a side section view.

A proper, intended mounted position is exemplarily shown in the FIG. 3. It is clearly shown that the longitudinal axis 24 of the piston unit 4 (shown in a dash-dotted line) is inclined downwardly at a defined angle to the horizontal. For example, the longitudinal axis 24 of the piston unit 4 is mounted to the handlebar 101 inclined 30°+/−10° downwardly to the horizontal. The precise angular position to the mounting axis 18 respectively to the handlebar 101 ensues for example, from the extended forefinger of a person sitting on the bicycle 100 and touching the brake lever 2, in a straight line with the person's forearm. The longitudinal axis 24 of the piston unit 4 also corresponds to the principal plane of the master unit 10, so that the master unit 10 is mounted to the handlebar 101 inclined downwardly to the horizontal at such an angle, also in respect of its principal plane. The vent duct arrangement 9 presently shown, allows reliable and safe venting also in other proper, intended mounted positions.

The vent duct arrangement 9 comprises two duct branches **29*a*, 39*a*. A first duct branch 29*a* opens into the pressure space 131 and in the vent opening 65, into the environment. A second duct branch 39*a* opens into the tank space 15 and into the first duct branch 29*a*. The first duct branch 29*a* shown is configured as a principal duct 29. The second duct branch 39*a* shown is configured as a branch duct 39, branching off the principal duct 29. The principal duct 29 and the branch duct 39** show a straight outline, such that they can be manufactured by means of drilling or another, comparable process.

The principal duct 29 extends steeper than does the branch duct 39. For example, the longitudinal axis of the principal duct 29 (in a broken line in the FIG. 4) shows a substantially vertical outline. The longitudinal axis of the principal duct 29 extends for example at an angle 69 of 120°+/−15° to the longitudinal axis 24 of the piston unit 4. Since the longitudinal axis 24 of the piston unit 4 also corresponds to the principal plane of the master unit 10, the longitudinal axis of the principal duct 29 thus likewise extends at such an angle to the principal plane of the master unit 10. The longitudinal axis of the branch duct 39 shows a substantially horizontal extension.

The mouths of the vent duct arrangement 9 in the pressure space 131 and in the tank space 15 lie on a level higher than the equalizing hole 53 and the lubrication hole 63. Moreover, the entire branch duct 39 extends higher than the highest spot of the pressure space 131. In the proper, intended mounted position, the vent opening 65 represents the highest spot of the vent duct arrangement 9 and also of the entire hydraulic circuit 11. As best shown in the FIG. 3, the tank space 15 lies above the pressure space 131, so that the equalizing hole 53 and the lubrication hole 63 also extend upwardly and substantially vertically.

The vent duct arrangement 9 extends between the handlebar mount 8 and the tank space 15 inside of the housing body 49. The housing body 49 is provided by the base body 20, so that the vent duct arrangement 9 also forms an integral component of the base body 20. The vent duct arrangement 9 is manufactured for example by incorporating recesses and, in particular, bores in the base body 20.

For pressure-resistant closure of the vent duct arrangement 9, a detachable paddle 19 is provided, which is shown as a screw **19*a* configured with an (external) threaded portion 190. The bottom end of the paddle 19 is provided with a conical sealing surface 191. The top end is provided with a collar section 193, which for example matches the head of the screw 19*a*. The top end of the screw 19*a* is provided with a socket for screwdrivers. The paddle 19 only extends in the principal duct 29**.

The paddle 19 can be screwed in so that the pressure space 131 is sealed relative to both the tank space 15 and the vent opening 65. To this end, the sealing surface 191 rests against a corresponding seating 192 of the principal duct 120. For sealing the vent opening 65 from the vent duct arrangement 9, a sealing body 194 and for example a sealing ring is disposed between the collar section 193 and the housing body 49. Releasing the paddle 19 causes the pressure space 131 to connect with the tank space 15. Thereafter, the vent opening 65 is opened.

The seating 192 is provided by a cross section reduction 29*b* in the principal duct 29. Beneath the cross section reduction 29*b*, the principal duct 29 has a duct cross section whose diameter is narrower than the diameter of the duct cross section above the cross section reduction 29*b*.

Here, the threaded portion 190 of the paddle 19 only extends between the branch duct 39 and the vent opening 65. This allows hydraulic fluid to escape out of the principal duct 29 through the branch duct 39 in the tank space 15 as the paddle 19 is screwed in. Moreover, hydraulic fluid and air can also escape through the equalizing hole 53 into the tank space 15. Thus, the vent duct arrangement 9 can be filled up with hydraulic fluid prior to inserting the paddle 15. Filling up ensures that no air remains in the vent duct arrangement 9.

The invention shown does not require for the master unit 10 to pivot out of its proper, intended mounted position to another, specific position, for venting. The mounted position also corresponds to the venting position. In other words, the invention allows complete and safe venting of the master unit 10 in its normal operating position on the handlebar 101. Moreover, a so-called comfort vent is possible, so as to prevent oil contamination. For example, extremely fast venting is possible on the road respectively in the field, only requiring to unscrew the paddle 15.

Figure 4:
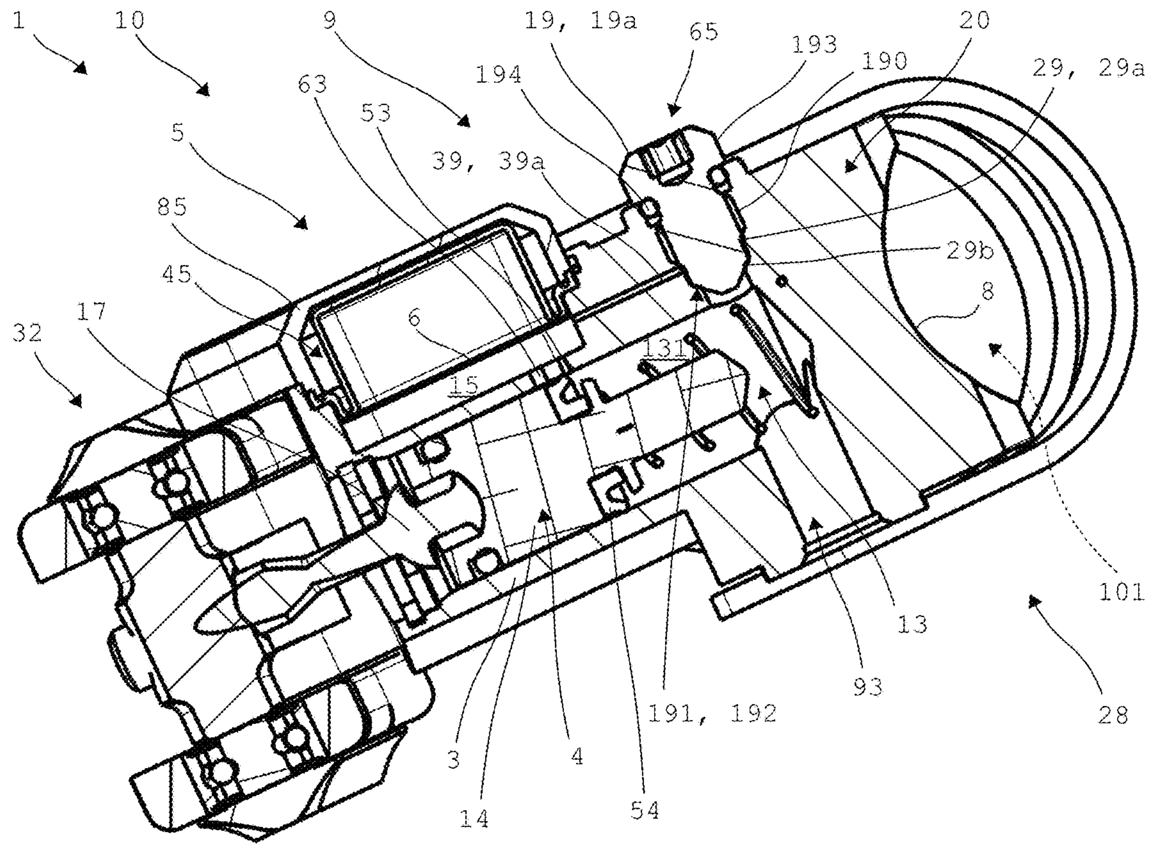
FIGS. 4-6 schematic detail illustrations of variants of the brake arrangement.

FIG. 4 shows a variant of the brake arrangement 1 described with reference to FIG. 3. The master unit 10 is likewise fastened with the lever-side end 32 to the handlebar 101, not shown, in the proper, intended mounted position obliquely downwardly by means of a handlebar mount 8. The longitudinal axis of the principal duct 29 extends for example at an angle 69 of 90°+/−15° to the longitudinal axis 24 of the piston unit 4. Moreover, the branch duct 39 extends in parallel to the longitudinal axis 24 of the piston unit 4. The equalizing reservoir device 5 shown is provided with a membrane unit 6, closing the tank space 15 upwardly, so that the highest spot of the tank space 15 lies in the tank space opening 79.

Figure 5:
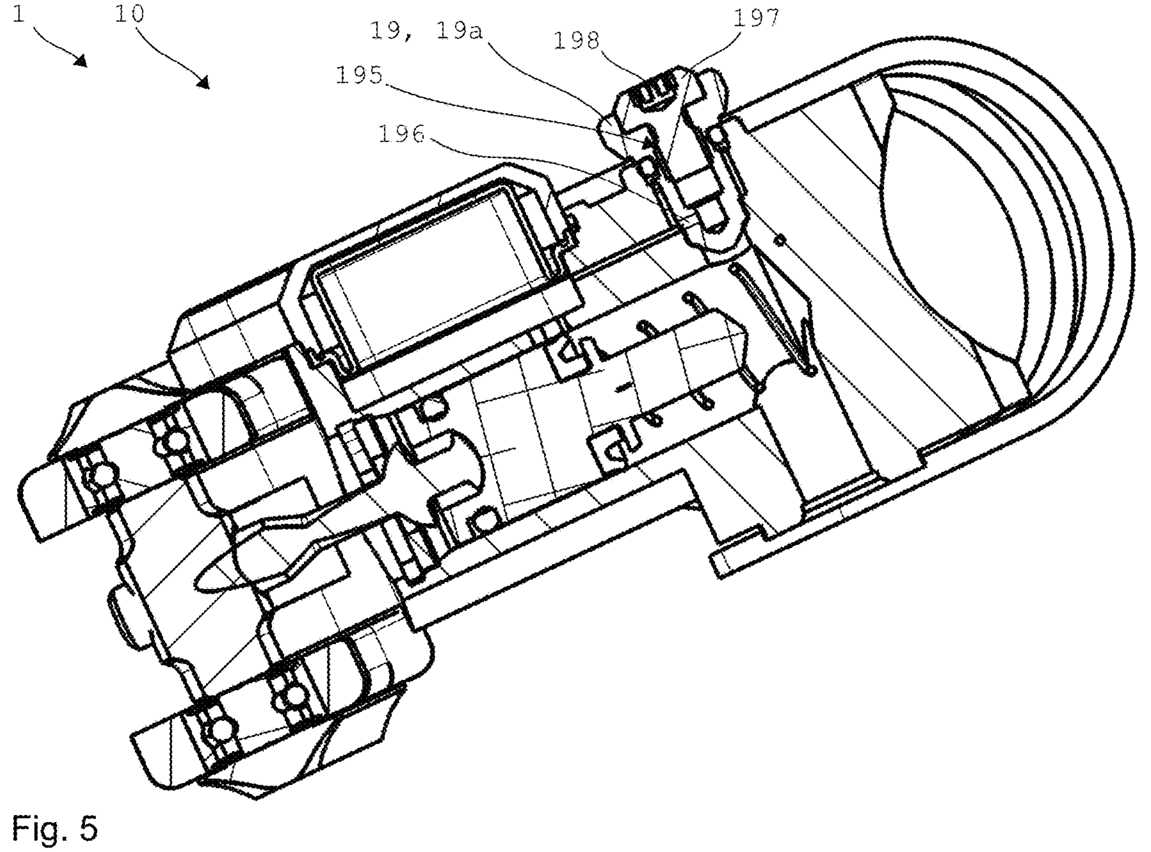

FIG. 5 shows the master unit 10 of the FIG. 4, which is provided with a particularly advantageous paddle 19 with a blind hole 195 and a transverse duct 196. The blind hole 195 is configured with two steps, so as to provide for two diameter areas (the larger diameter area having the internal thread).

The blind hole 195 is closed from the environment by means of a blind hole locking screw 197. The blind hole locking screw 197 has a tool socket 198 for applying a tool, e.g. a hollow hexagon wrench. The transverse duct 196 is connected with the tank space 15 through the branch duct 39. When the tank space 15 is to be vented or filled with hydraulic fluid, only the blind hole locking screw 197 is released, while the paddle 19 continues to seal the pressure space 131.

Figure 6:
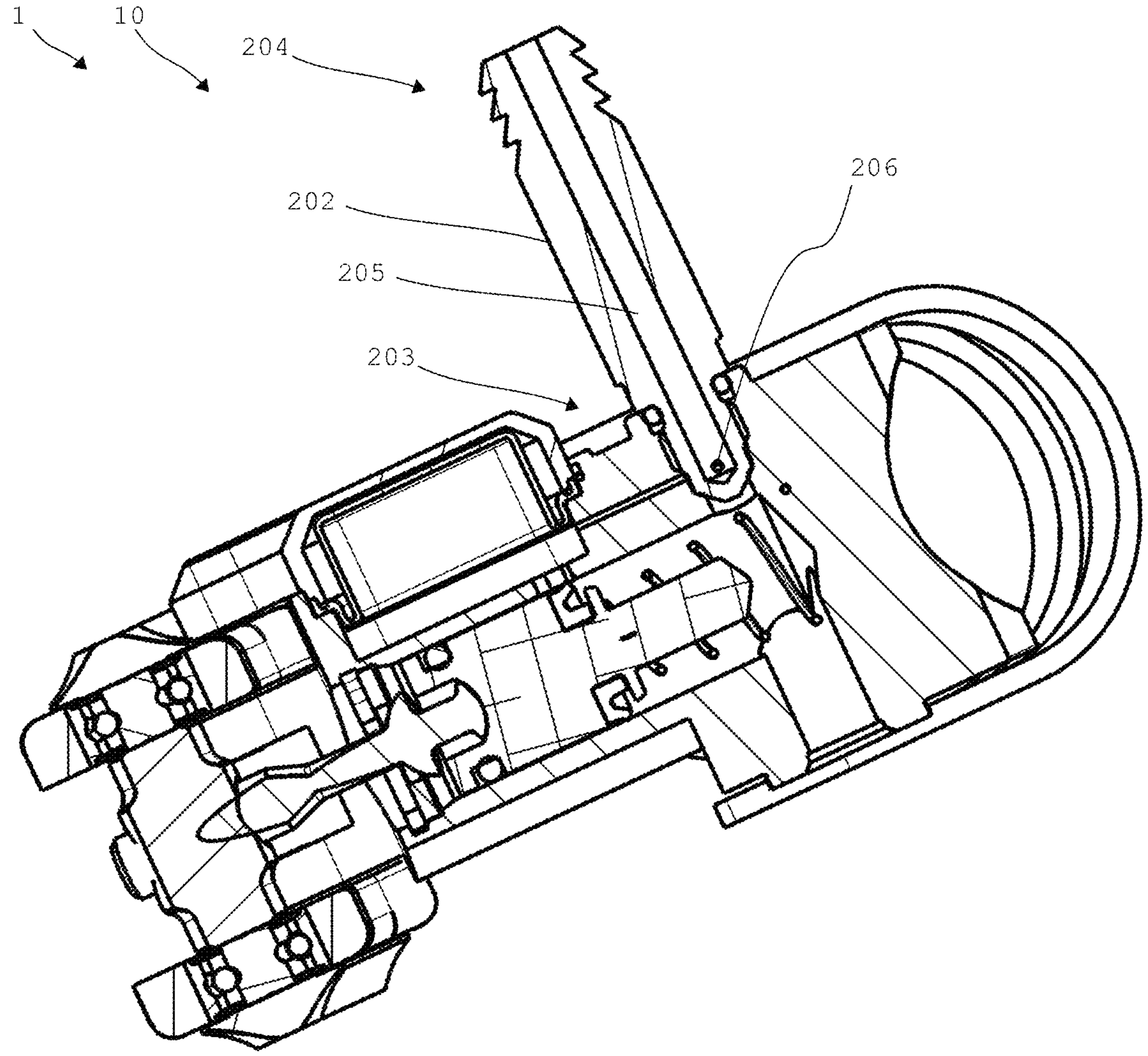

FIG. 6 shows the master unit 10 of the FIG. 4, with the paddle 19 removed and temporarily replaced by a tube-like filling adapter 202 with two ends 203, 204. When the filling adapter 202 is screwed in, as presently shown, the first end 203 seals the pressure space 131. Then, the blind hole 205 and the radial filling duct 206 allow filling the tank space 15 with hydraulic fluid and at the same time venting, while the pressure space 131 remains closed. The second end 204 may accommodate e.g. a hose.

While a particular embodiment of the present hydraulic brake arrangement for an at least partially muscle-powered bicycle have been described herein, it will be appreciated by those skilled in the art that changes and modifications may be made thereto without departing from the invention in its broader aspects and as set forth in the following claims.

| List of reference numerals: | |
|---|---|
| 1 | brake arrangement |
| 2 | brake lever |
| 3 | cylinder housing |
| 4 | piston unit |
| 5 | equalizing reservoir device |
| 6 | membrane unit |
| 8 | handlebar link |
| 9 | vent duct arrangement |
| 10 | master unit |
| 11 | hydraulic circuit |
| 12 | brake lever pivot axis |
| 13 | cylinder space |
| 14 | piston |
| 15 | tank space |
| 17 | connecting rod device |
| 18 | mounting axis |
| 19 | paddle |
| 19a | screw |
| 20 | base body |
| 22 | lever accommodation |
| 24 | longitudinal axis |
| 28 | end |
| 29 | principal duct |
| 29a | duct branch |
| 29b | cross section reduction |
| 32 | end |
| 39 | branch duct |
| 39a | duct branch |
| 45 | air space |
| 49 | housing body |
| 53 | equalizing hole |
| 54 | primary sealing |
| 59 | angle |
| 63 | lubrication hole |
| 64 | secondary sealing |
| 65 | vent opening |
| 69 | angle |
| 75 | tank trough |
| 79 | tank space opening |
| 85 | cover |
| 89 | pressure space opening |
| 93 | connection port |
| 100 | bicycle |
| 101 | handlebar |
| 102 | wheel, front wheel |
| 103 | wheel, rear wheel |
| 104 | frame |
| 105 | fork, suspension fork |
| 106 | rear wheel damper |
| 107 | saddle |
| 109 | spoke |
| 110 | rim |
| 112 | pedal crank |
| 113 | clamping system |
| 114 | grip |
| 131 | pressure space |
| 190 | threaded portion |
| 191 | sealing surface |
| 192 | seating |
| 193 | collar section |
| 194 | sealing body |
| 195 | blind hole |
| 196 | transverse duct |
| 197 | blind hole locking screw |
| 198 | tool socket |
| 200 | slave unit |

-continued

| List of reference numerals: | |
|---|---|
| 201 | line device |
| 202 | filling adapter |
| 203 | end |
| 204 | end |
| 205 | blind hole |
| 206 | filling duct |

The invention claimed is:

1. A hydraulic brake arrangement for an at least partially muscle-powered bicycle, comprising: at least one master unit provided for fluid connection with a slave unit and for mounting to a handlebar by means of at least one handlebar mount; wherein the master unit comprises a brake lever and a cylinder housing with a cylinder space, and a piston unit displaceably received in the cylinder space; and at least one equalizing reservoir device with a tank space for a hydraulic fluid, wherein the piston unit and the cylinder housing delimit a pressure space; wherein the pressure space is connected with the tank space through at least one equalizing hole; wherein the handlebar mount defines a mounting axis; and wherein the master unit can be mounted at a rotation angle around the mounting axis, by means of the handlebar mount; wherein the brake lever is disposed at the lever-side end of the master unit; and the handlebar mount is disposed at the handlebar-side end of the master unit; further comprising a vent duct arrangement, connecting a vent opening, which opens into the ambient environment, both with the tank space opening and with the pressure space opening, to allow simultaneous venting through the vent opening to both the tank space and the pressure space;

the vent duct arrangement rises between the pressure space opening and the vent opening and between the tank space opening and the vent opening, so that any air bubbles can rise to the vent opening out of the pressure space and out of the tank space, when the master unit is rotated around the mounting axis so that the lever-side end faces downwardly and the pressure space opening lies in the range of the highest spot of the pressure space, and the tank space opening lies in the region of the highest spot of the tank space.

2. The brake arrangement according to claim 1, wherein the vent duct arrangement is provided to be closed by means of a detachable paddle, and wherein the paddle can be inserted in the vent duct arrangement, so that the pressure space is sealed relative to the tank space and also relative to the vent opening, and wherein the paddle is in particular configured as a screw.

3. The brake arrangement according to claim 2, wherein releasing the paddle causes the pressure space to connect with the tank space and also to open the vent opening.

4. The brake arrangement according to claim 2, wherein the paddle comprises at its bottom end facing the pressure space, an in particular conical sealing surface which corresponds with a seating, wherein the seating is provided by a cross section reduction in the principal duct, and wherein the paddle comprises at its top end facing the vent opening, a collar section, and wherein between the collar section and the housing body in which the vent duct arrangement is configured, at least one sealing body is disposed for sealing the vent duct arrangement relative to the environment.

5. The brake arrangement according to claim 2, wherein the paddle comprises at least one threaded portion for screwing into the vent duct arrangement, and wherein the threaded portion is disposed between the branch duct and the vent opening and/or is not disposed between the branch duct and the pressure space, when the paddle is screwed into the vent duct arrangement.

6. The brake arrangement according to claim 2, wherein the paddle is disposed in the principal duct only when it seals the pressure space relative to the tank space and also relative to the vent opening.

7. The brake arrangement according to claim 1, wherein the vent duct arrangement comprises at least one principal duct which extends from the pressure space to the vent opening, and at least one branch duct, which extends from the principal duct to the tank space, and wherein the principal duct extends in particular steeper than does the branch duct.

8. The brake arrangement according to claim 7, wherein the entire branch duct extends higher than the highest spot of the pressure space, and/or wherein the mouth of the branch duct into the principal duct is disposed higher than the mouth of the principal duct into the pressure space.

9. The brake arrangement according to claim 1, wherein the air bubbles can rise to the vent opening out of the pressure space and out of the tank space, at least when the master unit is rotated around the mounting axis at an angle between 0° and 90° to the horizontal.

10. The brake arrangement according to claim 1, wherein the piston unit is accommodated in the cylinder space, displaceably along a longitudinal axis, and wherein the piston unit extends between the lever-side end and the handlebar-side end in respect of its longitudinal axis, and wherein the piston unit is displaceable by operating the brake lever from the lever-side end in the direction toward the handlebar-side end.

11. The brake arrangement according to claim 1, wherein the vent duct arrangement comprises at least two duct branches, wherein at least one duct branch opens into the pressure space and at least one duct branch, into the tank space.

12. The brake arrangement according to claim 1, wherein the tank space is disposed above the pressure space at least in sections.

13. The brake arrangement according to claim 1, wherein the vent opening represents the highest spot of the vent duct arrangement and preferably of the entire hydraulic circuit, and is in particular disposed higher than the highest spot of the tank space and/or the pressure space.

14. The brake arrangement according to claim 1, wherein the handlebar mount and the piston unit are disposed relative to one another so that the piston unit protrudes radially from the handlebar relative to its longitudinal axis, when the master unit is mounted to the handlebar in the proper, intended mounted position.

15. A bicycle with a hydraulic brake arrangement according to claim 1.

* * * * *